United States Patent
Sperling et al.

(10) Patent No.: US 9,658,328 B1
(45) Date of Patent: May 23, 2017

(54) SYSTEM AND METHOD FOR INDICATING POTENTIAL WIND SHEAR EVENTS

(71) Applicants: Steven Sperling, Cedar Rapids, IA (US); Michael W. Oglesby, Center Point, IA (US)

(72) Inventors: Steven Sperling, Cedar Rapids, IA (US); Michael W. Oglesby, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/856,938

(22) Filed: Sep. 17, 2015

(51) Int. Cl.
*G01S 13/00* (2006.01)
*G01S 13/94* (2006.01)
*G01W 1/00* (2006.01)
*G01S 13/95* (2006.01)
*G01S 13/86* (2006.01)

(52) U.S. Cl.
CPC ............ *G01S 13/953* (2013.01); *G01S 13/86* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,077,673 A | * | 12/1991 | Brodegard | G01S 13/74 342/29 |
| 5,523,759 A | * | 6/1996 | Gillberg | G01S 13/953 342/26 B |
| 6,002,347 A | * | 12/1999 | Daly | G01S 13/91 340/945 |
| 6,127,944 A | * | 10/2000 | Daly | G01S 13/91 340/945 |
| 7,557,735 B1 | * | 7/2009 | Woodell | G01S 13/953 340/649 |
| 8,723,693 B1 | * | 5/2014 | Cahoon | B64D 43/00 340/945 |
| 2005/0156777 A1 | * | 7/2005 | King | G01S 3/023 342/29 |

OTHER PUBLICATIONS

RTCA, Minimum Operational Performance Standards for Airborne Weather Radar with Forward-Looking Windshear Capability, published Sep. 21, 1993, updated Jun. 23, 1995, 293 pages, RTCA, Incorporated, Washington, D.C.

* cited by examiner

*Primary Examiner* — Yonel Beaulieu
(74) *Attorney, Agent, or Firm* — Donna P. Suchy; Daniel M. Barbieri

(57) ABSTRACT

An aircraft weather radar system can include an electronic display, a radar antenna for receiving radar returns, and an electronic processor. The electronic processor can be configured to determine an existence of potential wind shear activity using the radar returns and cause the electronic display to provide an indication of the potential wind shear activity. The potential wind shear activity is different than a wind shear condition associated with a predictive wind shear icon for a wind shear event.

20 Claims, 6 Drawing Sheets

SYSTEM AND METHOD FOR INDICATING POTENTIAL WIND SHEAR EVENTS

BACKGROUND

The present disclosure relates generally to the field of warning systems. The present disclosure more specifically relates to the field of wind shear warning systems.

Predictive wind shear detection and alert systems are fitted on an aircraft to detect a wind shear event and alert the pilot to the wind shear event. Predictive wind shear detection systems are generally part of weather radar systems that provide radar beams in the environment of the aircraft and process radar returns associated with the beams to detect the wind shear event. FIG. 1 shows a weather radar display 10. The weather radar system of the aircraft detects the presence of the wind shear event by detecting the Doppler frequency shift associated with the radar returns and provides a visual indicator 12 of the wind shear event on the weather radar display 10 when a calculated F-factor value related to the Doppler frequency shift is above a threshold of 0.085. The F-factor is defined in the RTCA DO-220 document.

Generally, the visual indicator 12 (e.g., the predictive wind shear (PWS) icon) of the wind shear event overlays the weather radar display 10 if the wind shear event is detected according to the RTCA DO-220 document. The visual indicator 12 is a large fan-shaped symbol including multiple colors that draws the pilot's attention to the wind shear threat. Such a conventional visual indicator does not provide the pilot an advance warning of an impending or potential wind shear condition that is approaching the threshold for a wind shear event (e.g., the F-factor threshold value of 0.085).

Thus, there is a need for a predictive wind shear warning system that provides an indication of a potential wind shear condition or pre-wind shear condition. Further, there is a need for a weather radar display that indicates areas in which the radar is detecting wind shear activity which has not triggered display of the standard PWS icon according to the RTCA DO-220 document. Further still, there is a need for a pre-wind shear event indicator that is smaller than, simpler to display than, and unique from the standard PWS icon. Yet further, there is a need for a predictive wind shear system that displays a warning of a potential wind shear condition based upon lower minimal threat threshold criteria than the PWS icon threshold. Further, there is a need for a weather radar system that alerts a pilot that the weather radar system has identified and is tracking developing wind shear activity. Yet further, there is a need for a weather radar system including a user interface that dynamically provides current radar wind shear data textually and/or graphically. Still further, there is a need for a weather radar system including a user interface that dynamically provides current radar wind shear data on a per epoch and/or per sweep basis, in such a way that parallels, in real-time, the weather radar sweep display.

SUMMARY

In certain aspects, embodiments of the inventive concepts disclosed are directed to an aircraft weather radar system including an electronic display, a radar antenna for receiving radar returns, and an electronic processor. The electronic processor is configured to determine an existence of potential wind shear activity using the radar returns and cause the electronic display to provide an indication of the potential wind shear activity. The potential wind shear activity is different than a wind shear event associated with a predictive wind shear icon.

In further aspects, embodiments of the inventive concepts disclosed are directed to a method of displaying an indication of potential wind shear activity on an electronic weather radar display for an aircraft. The method includes receiving radar returns and determining an existence of potential wind shear activity associated with at least one real world location using the radar returns. The method also includes providing an indication of the potential wind shear activity on the electronic weather radar display at a first location on the electronic weather radar display corresponding to the real world location. The potential wind shear activity is different than a wind shear event associated with a predictive wind shear icon.

In further aspects, embodiments of the inventive concepts disclosed are directed to an aircraft weather radar system. The aircraft weather radar system includes an electronic display, a radar antenna for receiving radar returns, and an electronic processor configured to determine an existence of potential wind shear activity using the radar returns and cause the electronic display to provide an indication of the potential wind shear activity. The potential wind shear activity is different than a wind shear event associated with a predictive wind shear icon.

In further aspects, embodiments of the inventive concepts disclosed are directed to an aircraft weather radar system including at least one processor in communication with a radar antenna and a non-transitory storage medium storing processor executable code comprising instructions. The instructions are for:

determining an F-factor associated with a predictive wind shear condition;

providing a predictive wind shear warning on an electronic display in response to the F-factor being above the DO-220 specified PWS threshold; and providing a pre-warning indicator on the electronic display in response to the radar system detecting wind shear activity which has not triggered the DO-220 specified PWS warning.

BRIEF DESCRIPTION OF THE DRAWINGS

The disclosure will become more fully understood from the following detailed description, taken in conjunction with the accompanying drawings, wherein like reference numerals refer to like elements, in which.

DETAILED DESCRIPTION

Referring generally to the figures, systems and methods for indicating presence of a potential or pre-predictive wind shear condition are described. In some embodiments, a predictive wind shear warning system advantageously provides an indication of a potential wind shear condition on a weather radar display to make a pilot aware of areas in which the radar is detecting wind shear activity which has not triggered the standard PWS icon. In some embodiments, the potential wind shear indicator is a small, non-intrusive, easy to comprehend symbol that is unique with respect to the standard PWS icon.

In some embodiments, a predictive wind shear system and method displays a warning of a potential wind shear condition that has not triggered the standard PWS warning provided by the RTCA DO-220 document. The warning of the potential wind shear condition alerts a pilot that the predictive wind shear system has identified and tracking developing wind shear activity in some embodiments. The predictive wind shear system includes a user interface that dynamically provides current radar wind shear data, both textual and/or graphical, on a per-epoch and/or per-sweep basis, in such a way that parallels, in real-time, the weather radar sweep display in some embodiments.

In some embodiments, the predictive wind shear system uses a color bar to visually indicate the developing threat level, thereby enabling a visual comparison of the current threat level to that which would trigger display of the standard PWS icon. Advantageously, the predictive wind shear system automatically, repeatedly performs the predictive wind shear detection operation such that the display updates to the developing threat level automatically in some embodiments. In some embodiments, multiple potential predictive wind shear conditions or pre-wind shear conditions are tracked and displayed, thereby enabling the pilot to either focus on one given potential wind shear condition or view all conditions including the latest detected condition.

Display of potential predictive wind shear conditions before they become wind shear events allows the pilot to anticipate wind shear warnings and choose paths for avoiding wind shear conditions in some embodiments. Pilot awareness of developing predictive wind shear conditions before they actually trigger the PWS icon on the display advantageously gives the pilot more lead-time to anticipate a potential problem and evaluate the best reactive plan in some embodiments.

Figure 1:
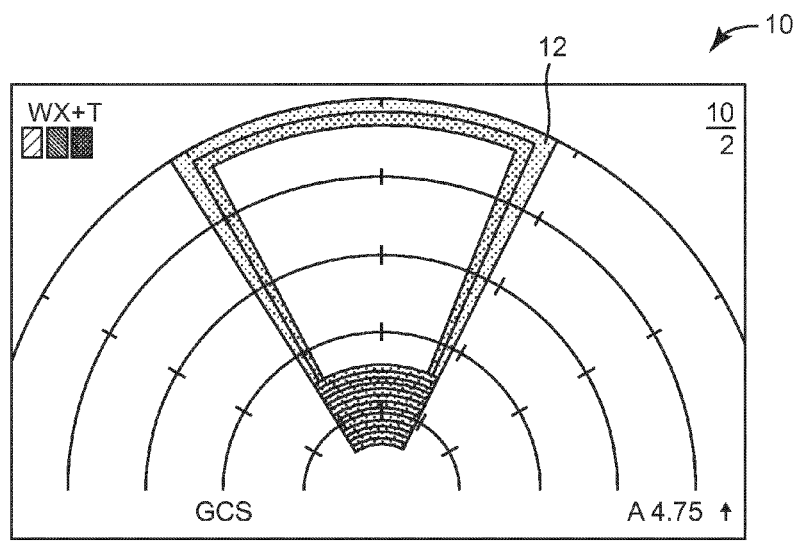
FIG. 1 is an illustration of a conventional predictive wind shear (PWS) icon for a detected wind shear event on a weather radar display.
Figure 2:
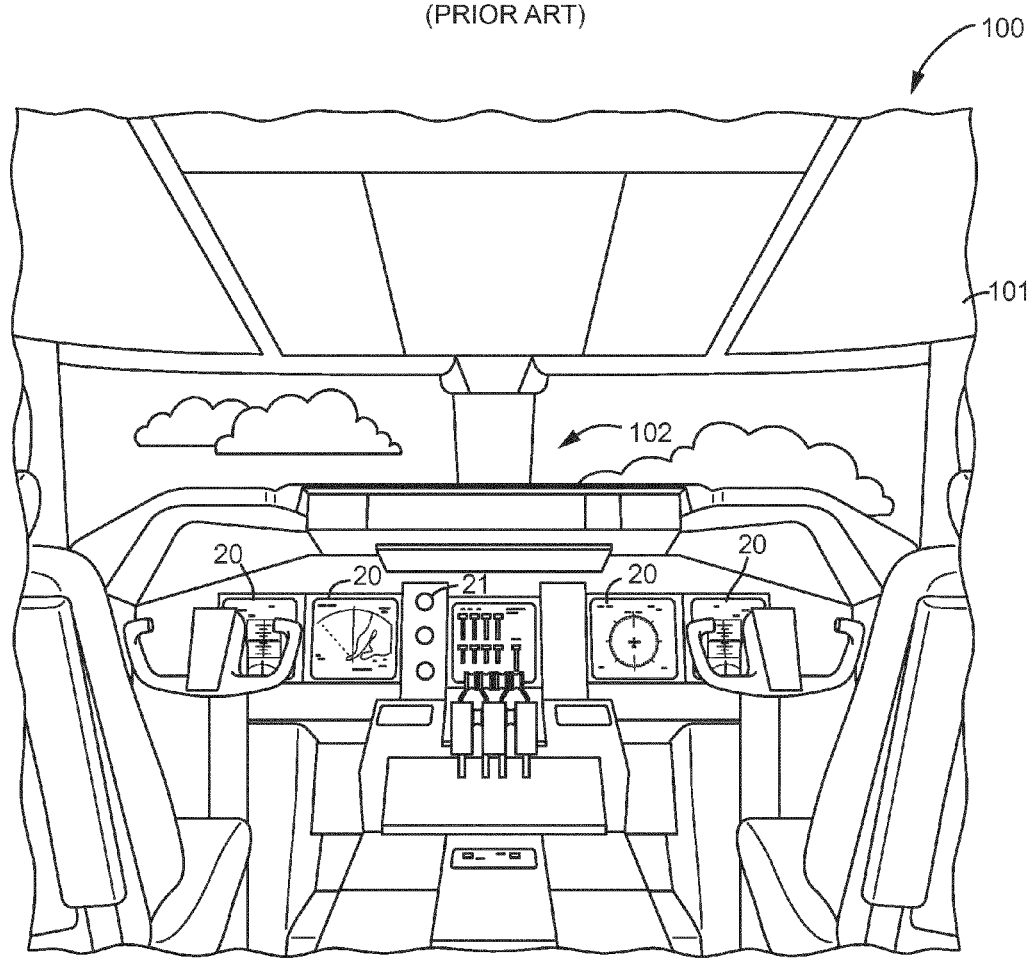
FIG. 2 is an illustration of an aircraft control center or cockpit having a predictive wind shear warning system according to some exemplary embodiments.

Referring to FIG. 2, an illustration of an aircraft control center 100 or cockpit for an aircraft 101 is shown, according to one exemplary embodiment. The aircraft control center 100 includes a predictive wind shear system 102 in communication with flight displays 20. The predictive wind shear system 102 detects potential wind shear condition as well as a predictive wind shear event and provides warnings of such conditions in some embodiments. The flight displays 20 can be used to provide information (e.g., potential predictive wind shear warnings as well as the PWS icon (the visual indicator 12 in FIG. 1)) to the flight crew, thereby increasing visual range and enhancing decision-making abilities.

In some exemplary embodiments, the flight displays 20 can provide an output from a radar system of the aircraft. The flight displays 20 can include a weather display, a joint display, a weather radar map and a terrain display. For example, the flight displays 20 can include a display configured to display a three dimensional perspective image of terrain and/or weather information. Other view of terrain and/or weather information may also be provided (e.g. plan view, horizontal view, vertical view, etc.). Additionally, the flight displays 20 can be implemented using any of a variety of display technologies, including CRT, LCD, organic LED, dot matrix display, touch screen, and others. The flight displays 20 can also include head-up displays (HUD) with or without a projector.

The aircraft control center 100 additionally includes one or more user interface (UI) elements 21. The UI elements 21 can include dials, switches, buttons, touch screens, or any other user input device. The UI elements 21 can be used to adjust features of flight displays 20, such as contrast, brightness, width, and length. The UI elements 21 can also (or alternatively) be used by an occupant to interface with or change the display of information on the flight displays 20. The UI elements 21 can additionally be used to acknowledge or dismiss an indicator provided by the flight displays 20. Further, the UI elements 21 can be used to select and obtain more information related to potential wind shear activity detected by the predictive wind shear system 102.

Figure 3:
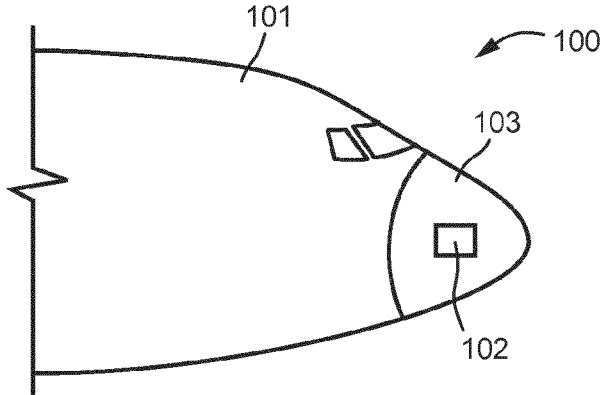
FIG. 3 illustrates a front portion of an aircraft including the predictive wind shear warning system illustrated in FIG. 2 according to some exemplary embodiments.

Referring to FIG. 3, the front of the aircraft 101 is shown with the aircraft control center 100 and a nose 103, according to some exemplary embodiments. The predictive wind shear system 102 is a radar system generally located inside the nose 103 of the aircraft 101 or inside the aircraft control center 100 in some embodiments. According to other exemplary embodiments, the predictive wind shear system 102 can be part of a weather radar system and be located anywhere on the aircraft 101. Furthermore, the various components of the predictive wind shear system 102 can be distributed at multiple locations throughout the aircraft 101.

Referring to FIG. 3, the predictive wind shear system 102 is configured to provide radar signals and receive radar returns for wind shear detection. The predictive wind shear system 102 includes a radar antenna 312, electronics 315, a display 316, a user interface 318, and a memory 320. The electronics 315 includes a processor 314 and a receive-and-transmit circuit 332. The receive-and-transmit circuit 332 includes a receiver 322 and a transmitter 328. The processor 314 includes a wind shear detector 346 and a transmit signal generator 342. The predictive wind shear system 102 is configured to warn the pilot of potentially threatening microbursts. The predictive wind shear system 102 is configured to, for example, give the pilots of the aircraft a "wind shear detected" or "wind shear ahead" indication (e.g., audibly, visually, etc.) when a wind shear event is detected within the flight path of the aircraft 101.

The display 316 is a primary flight display or any of the flight displays 20 in some embodiments. The electronics 315 can be a WXR-2100 MultiScan™ radar system or similar system manufactured by Rockwell Collins and configured as described herein. According to other embodiments, the electronics 315 can be a system similar to Rockwell Collins radars but which is manufactured by another radar manufacturer and configured as described herein. The predictive wind shear system 102 can be integrated with other avionic equipment and the user interface 318 in the aircraft control center 100 (e.g., UI elements 21 (FIG. 1), the flashing lights, the flight displays 20, display elements on a weather radar display, display elements on a terrain display, the audio alerting devices, navigation systems, terrain avoidance warning system (TAWS) equipment, etc.).

The processor 314 is generally configured to process data associated with radar returns received from radar antenna 312 to detect wind shear activity or conditions, receive input from user interface 318, and provide hazard indications on display 316. The transmit signal generator 342 causes the transmitter 328 and the antenna 312 to provide radar sweeps for wind shear detection within an area encompassed by +/−30 degrees in azimuth on either side of the aircraft heading and from 0 to 5 Nm in range from the aircraft nose 103 in some embodiments. The receiver 322 is coupled to the antenna 312 and is configured to receive returns received by the antenna 312. The antenna 312 can be any type of antenna suitable for wind shear detection operations including but not limited to mechanically controlled antennas, active electronic scanned array (AESA) antennas, passive electronic scanned array (PESA) antennas, hybrids thereof, etc.

According to various exemplary embodiments, the processor 314 can be any hardware and/or software processor or processing architecture capable of executing instructions and operating on data related to wind shear activity detection. According to various exemplary embodiments, the memory 320 can be any volatile or non-volatile memory capable of storing data and/or instructions related to predictive wind shear system 102.

The processor 314 processes data to provide hazard detection indications on the display 316, for example precipitation, lightning, hail, turbulence, terrain, ground structures, etc., in some embodiments. In addition, the processor 314 can cause predictive wind shear detection system 102 to perform further analysis in light of information from the user interface 318 or the memory 320. The further analysis can even include causing the predictive wind shear system 102 to perform radar queuing and control in azimuth and elevation as well as examining new data or historical data.

In some embodiments, the wind shear detector 346 of the processor 314 determines an F-factor as defined in the RTCA DO-220 document using the radar returns (e.g., the Doppler parameters associated with the radar returns, such as one or more of reflectivity parameters, velocity parameters, spectral width parameters, etc.). The F-factor is determined with respect to geographic locations in the radar scan provided by the wind shear detection system 102 in some embodiments. The wind shear detector 346 causes the display 316 to provide the PWS icon and aural warnings when the F-factor is greater than the threshold of 0.085 (e.g., a wind shear event) in some embodiments. In some embodiments, the wind shear detector 346 causes the display 316 to provide indications of potential wind shear activity whenever a pending wind-shear event is being tracked by the radar but the radar algorithm has not yet triggered the standard PWS icon display. Threshold value ranges for indicating potential wind-shear activity can be fitted to a particular weather radar system as needed. For example, the thresholds for potential wind shear activity could be an F-factor above 0.075, above 0.08, above 0.085, above 0.105, or above 0.1299 in some embodiments. Other threshold values can be chosen. In some embodiments, a level of threat can be displayed for the following ranges: 1.05 to 0.1299, 0.085 to 0.105, 0.08 to 0.085, and 0.075 to 0.08 (e.g., color coded as red, yellow, gray and green, respectively). In some embodiments, the ranges are fixed. In other embodiments, the ranges can be selected or adjusted for particular aircraft, geographic regions, weather conditions, etc.

Hysteresis can be employed by the wind shear detector 346 to prevent cycling of indications, cautions or warnings. In some embodiments, the wind shear detector 346 causes the display 316 to provide indications of whether the potential wind shear activity is increasing or decreasing (e.g., the F-factor rate of change over time).

Figure 5:
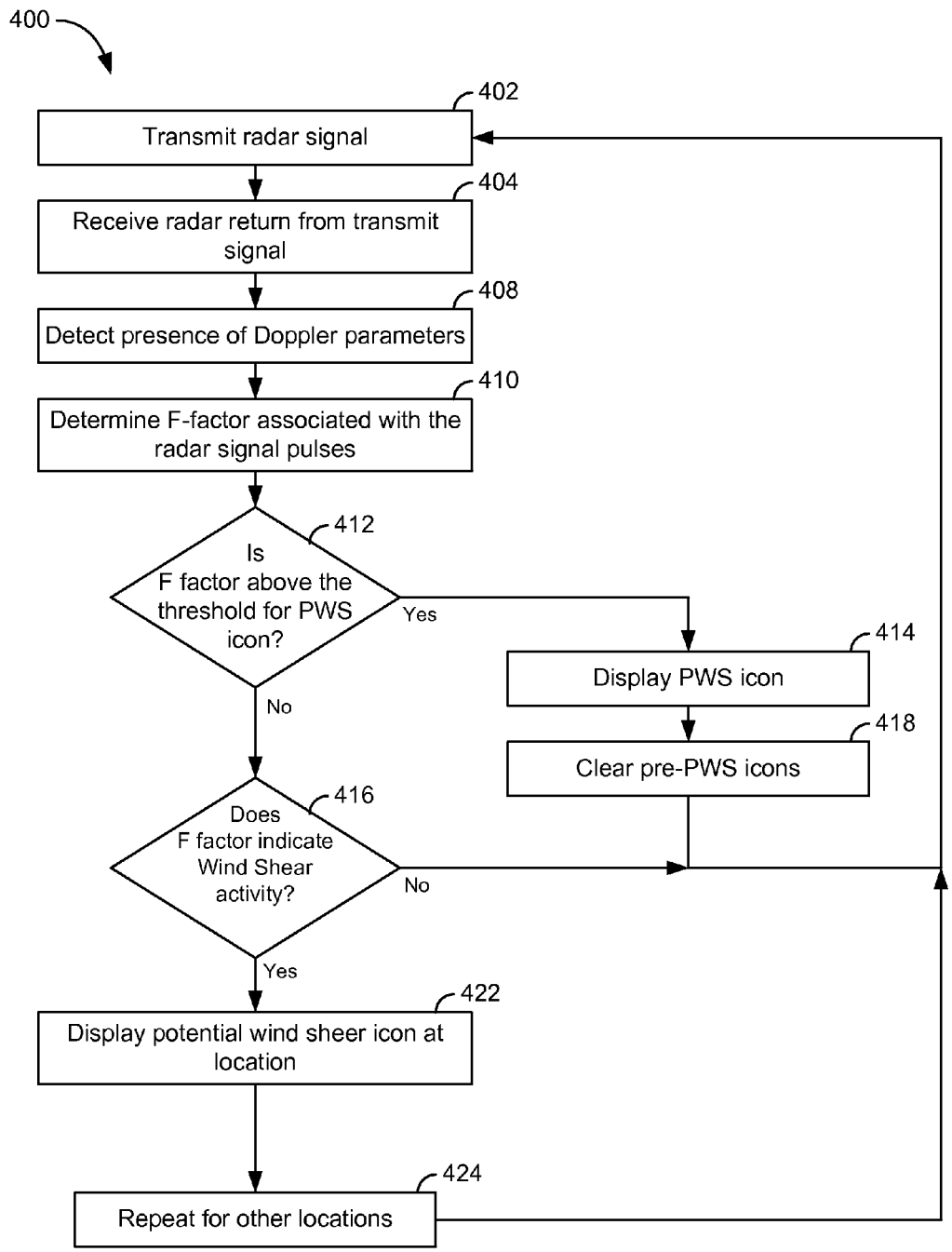
FIG. 5 is a process flow diagram of a method for detecting weather using the predictive wind shear warning system of FIG. 3 according to some exemplary embodiments.

With reference to FIGS. 3 and 5, a flow 400 can be executed by the processor 314 to detect wind shear conditions and potential wind shear conditions. At an operation 402, radar signals (e.g., X-band) for wind shear detection or weather detection are provided by the antenna 312. At an operation 404, radar returns associated with the radar signals are received by the antenna 312. At an operation 408, the wind shear detector 346 determines Doppler parameters (e.g., spectral width parameters) and locations associated with activity associated with those parameters using the radar returns from the operation 404. At an operation 410, the wind shear detector 346 determines an F-factor as defined by the RTCA DO-220 document using Doppler parameters from the operation 408.

At an operation 412, the wind shear detector 346 compares the F-factor to the threshold for a wind shear event. If the F-factor for a particular location is above the threshold of 0.085, the wind shear detector 346 causes the display 316 to provide the PWS icon and an aural warning. The PWS icons can indicate the location of the wind shear event in some embodiments. At an operation 418, potential wind shear condition indications or icons are removed from the display 316. The operation 418 is optional in some embodiments. After the operation 418, the processor 314 returns to the operation 402.

At the operation 412, if the F-factor for a particular location indicates wind shear activity, the wind shear detector 346 advances to an operation 416. At the operation 416, if the F-factor for any location is above a threshold associated with potential wind shear activity (e.g., a threshold above zero for the F-factor), the wind shear detector 346 advances to an operation 422. At the operation 422, the wind shear detector 346 causes the display 316 to provide an icon or an indication of potential wind shear activity. The indication or icon is provided at a location on the display 316 corresponding to the real world location of the potential wind shear activity. A level associated with the potential wind shear activity can also be provided on the display 316 in some embodiments. The level can be determined using the magnitude of the F-factor in some embodiments. The operation 422 can use other parameters than the F-factor to determine a potential wind shear condition including a comparison of Doppler parameters to a threshold or other parameters associated with microbursts or wind shear activity.

At operation 424, the operation 422 is repeated for all locations of potential wind shear conditions detected. After the operation 424, the wind shear detector 346 returns to the operation 402. At the operation 416, if the F-factor is below a minimum threshold for potential wind shear activity at all locations, the wind shear detector 346 advances to the operation 402.

Although potential wind shear activity and wind shear events are detected using the F-factor, other techniques can be used to detect potential and actual wind shear conditions. The principles of embodiments described herein apply to actual wind shear conditions and potential wind shear conditions detected using relationships different than the F-factor relationships listed above, using an F-factor different than that defined in the RTCA DO-220 document or using other parameters.

Figure 6:
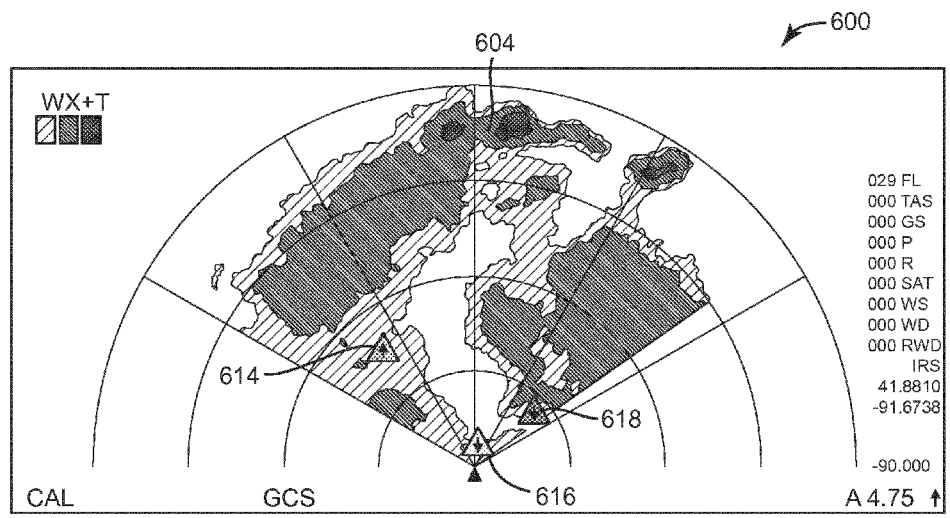
FIG. 6 is a schematic drawing of a weather radar display having potential wind shear indicators associated with the predictive wind shear warning system of FIG. 2 according to some exemplary embodiments.

Referring to FIG. 6, the predictive wind shear system 102 provides a threat display or a weather radar display 600 on at least one of the flight displays 20. The weather radar display 600 includes weather regions 604 provided in color in accordance with weather radar standards. The weather radar display 600 also includes potential wind shear icons 614, 616, and 618 provided at respective locations on the weather radar display 600 corresponding to the real world location of the potential wind shear activity. Advantageously, the use of multiple potential wind shear icons 614, 616, and 618 provides advantages over the PWS icon which has display requirements that can cause difficulty in visually discerning the reference points of possible multiple wind shear events in some embodiments. The potential wind shear condition icon 618 is color coded with a purple color to indicate a higher level, the potential wind shear condition icon 614 is color coded with a red color to indicate a medium level, and the potential wind shear condition icon 616 is color coded with a teal color to indicate a lower level in some embodiments. In some embodiments, the potential wind shear icons 614, 616, and 618 are provided with colored stippling instead of solid colors.

In some embodiments, the potential wind shear icons 614, 616, and 618 are flashed to increase visual awareness. In some embodiments, the potential wind shear icons 614, 616, and 618 are flashed once an F-factor or other measure of potential wind shear activity reaches a threshold associated with a more significant threat or a higher probability of becoming a wind shear event. In some embodiments, the potential wind shear icons 614, 616, and 618 are flashed when the F-factor exceeds 0.085 or 0.105. In some embodiments, the predictive wind shear icons 614, 616, and 618 are flashed more frequently based upon magnitude of the F-factor.

The potential wind shear icons 614, 616, and 618 include arrows 624, 626, and 628, respectively, or other graphic indicating potential wind shear in some embodiments. The arrows 624, 626, and 628 on the potential wind shear icons 614, 616, and 618 are sized in accordance with the size of the threat or point up if the wind shear activity is increasing and point down if the wind shear activity is decreasing in some embodiments. In some embodiments, the potential wind shear icons 614, 616, and 618 are chevron shaped or triangular. Various shapes can be used for the potential wind shear condition icons 614, 616, and 618. In some embodiments, a pilot can use a touch screen or user interface 318 (FIG. 4) to select one of the potential wind shear condition icons 614, 616, and 618 and to obtain further data about the potential wind shear condition, such as, range, direction from the aircraft 101, specific level (e.g., magnitude of F-factor), percentage of the PWS icon threshold reached, a map of F-factor values, etc.

Figure 7:
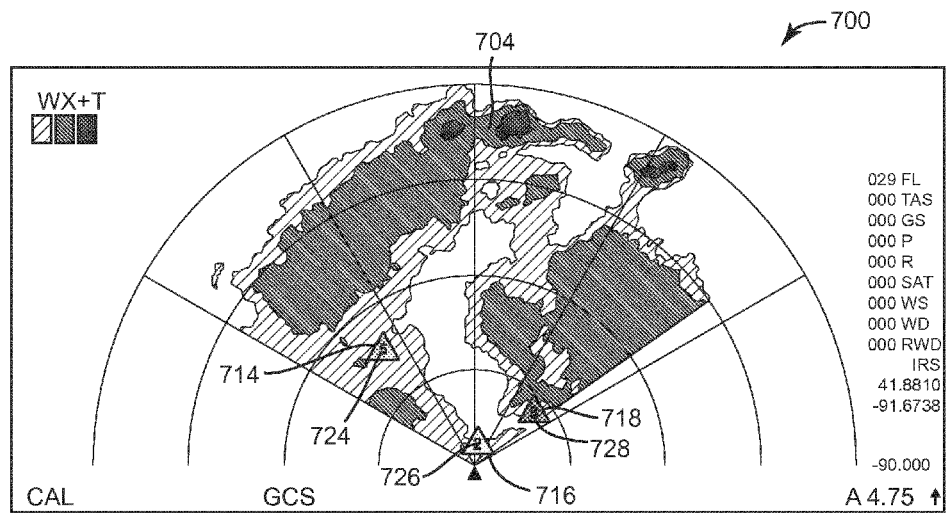
FIG. 7 is a schematic drawing of a weather radar display having potential wind shear indicators associated with the predictive wind shear warning system of FIG. 2 according to some exemplary embodiments.

Referring to FIG. 7, the predictive wind shear system 102 provides a weather radar display 700 on at least one of the flight displays 20. The weather radar display 700 includes weather regions 704 provided in color in accordance with weather radar standards. The weather radar display 700 also includes potential wind shear icons 714, 716, and 718 provided at location on the weather radar display corresponding to the real world location of the potential wind shear activity. The potential wind shear icon 718 includes a textual number 728 (e.g., from 1 to 9) to indicate the magnitude of the potential wind shear condition (e.g., the magnitude of the F-factor) level in some embodiments. In some embodiments, the potential wind shear icon 714 includes a textual number 724, and the potential wind shear icon 716 includes a textual number 726.

Figure 8:
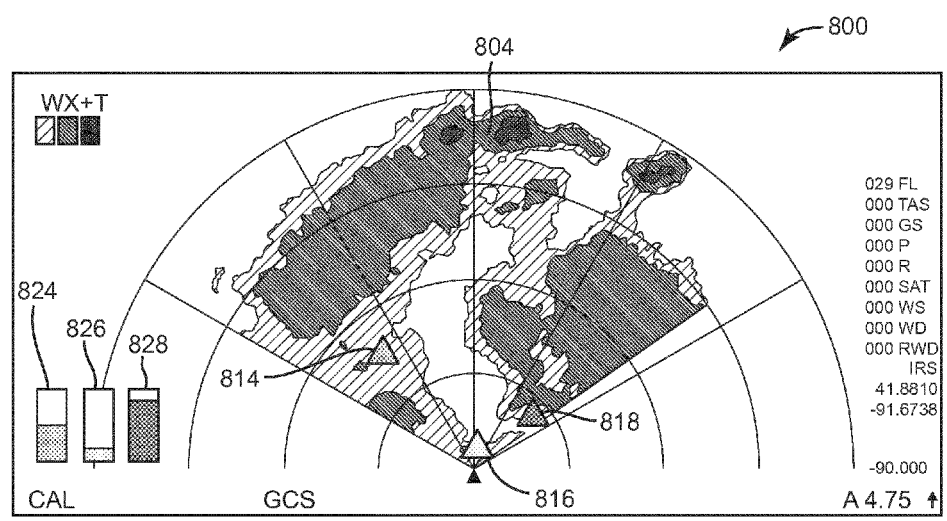
FIG. 8 is a schematic drawing of a weather radar display having potential wind shear indicators associated with the predictive wind shear warning system of FIG. 2 according to some exemplary embodiments.

Referring to FIG. 8, the predictive wind shear system 102 provides a weather radar display 800 on at least one of the flight displays 20. The weather radar display 800 includes weather regions 804 provided in color in accordance with weather radar standards. The weather radar display 800 also includes potential wind shear icons 814, 816, and 818 provided at location on the weather radar display corresponding to the real world location of the potential wind shear activity in some embodiments.

The weather radar display 800 also includes bars 824, 826, and 828 provided in a corner of the weather display 800 so as not to obscure the weather regions 804. The bars 824, 826, and 828 represent the magnitude of the potential wind shear condition. The bars 824, 826, and 828 are each associated with one of the potential wind shear icons 814, 816, and 818 in some embodiments. In some embodiments, the bars 824, 826, and 828 are associated with the potential wind shear icons 814, 816, and 818, respectively. In some embodiments, the bars 824, 826, and 828 are disposed in a left to right orientation with respect to the left to right orientation of the potential wind shear icons 814, 816, and 818 on the weather radar display. In some embodiments, the bars 824, 826, and 828 are provided without the potential wind shear icons 814, 816, and 818 on the weather radar display 800. In some embodiments, the potential wind shear icons 814, 816, and 818 and/or the bars 824, 826, and 826 are provided on a non-weather radar display (e.g., a dedicated wind shear display, terrain avoidance display, or another avionic display).

In some embodiments, the bars 824, 826, and 828 are color coded and/or have a length corresponding to the magnitude the potential wind shear activity (e.g., the magnitude of the F-factor). The color codes can include green, yellow and red in order of small magnitude to large magnitude. The color legends are graduated in some embodiments. In some embodiments, each of the bars 824, 826, and 828 is located next to its associated potential wind shear icon 814, 816, and 818. In some embodiments, the bars 824, 826, and 828 are situated from right to left or from up to down in order of threat magnitude. In some embodiments, bars 824, 826, and 828 are situated on the weather radar display 800 in order (e.g., up to down or left to right) of the proximity of the associated wind shear activity to the aircraft 101. In some embodiments, the bars 824, 826, and 828 include a number or other reference corresponding to a number or other reference on the potential wind shear icon 814, 816, and 818.

Figure 4:
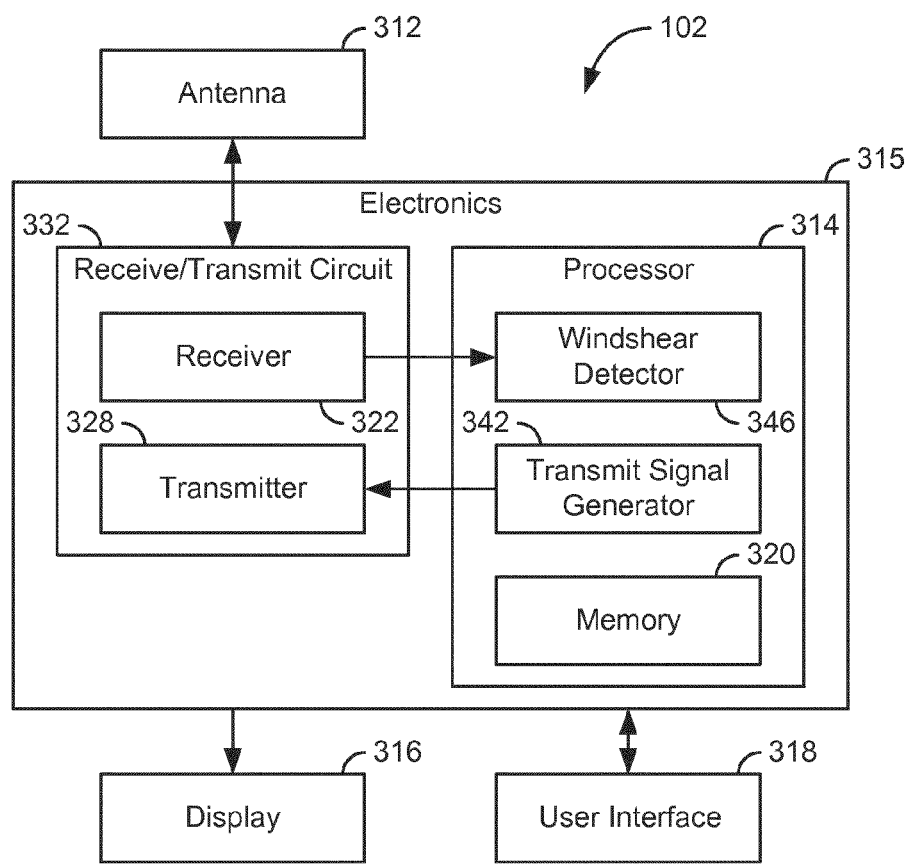
FIG. 4 is a block diagram of the predictive wind shear warning system illustrated in FIG. 2 according to some exemplary embodiments.
Figure 9:
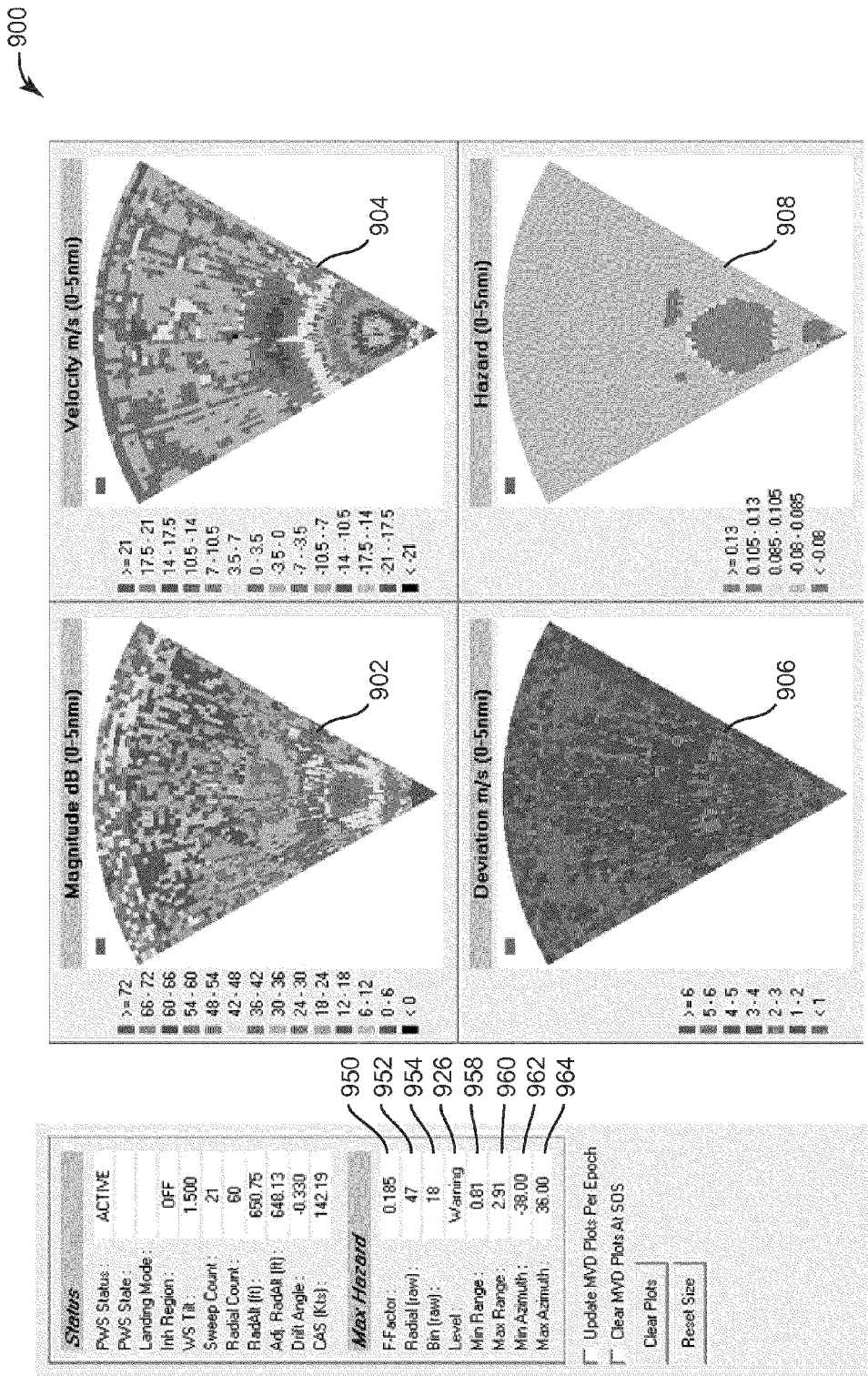
FIG. 9 is a schematic drawing of a display of information associated with predictive wind shear warnings for the predictive wind shear warning system of FIG. 2 according to some exemplary embodiments.

Referring to FIG. 9, the predictive wind shear system 102 provides additional wind shear detection information on a display 900 to the pilot in response to the user interface 318. One of the flight displays 20 provides one or more of maps 902, 904, 906, and 908 in response to the user interface 318 (FIG. 4). The map 902 is a color coded radar reflectivity map in decibels (dBs) for the radar returns received by the antenna 312 in some embodiments. The map 904 is a color coded velocity map in meters per second (m/s) for the radar returns received by the antenna 312 in some embodiments. The map 906 is a color coded deviation map in meters per second (m/s) for the radar returns received by the antenna 312 in some embodiments. The map 908 is a color coded F-factor map for the radar returns received by the antenna 312 in some embodiments. The additional wind shear detection information on the display 900 can also include textual information including but not limited to an F-factor 950, a radial reading 952, a bin reading 954, a warning level 956, a minimum range 958, a maximum range 964, a minimum azimuth 966, and a maximum azimuth 968 for at least one of the wind shear activity areas. In some embodiments, the pilot selects one of the potential wind shear condition icons 614, 616, and 618 (FIG. 6) to obtain the additional textual information for that potential wind shear condition icon 614, 616, or 618 on the display 900.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Further, other factors other than an F-factor can be used to detect potential wind shear conditions and their magnitude. Accordingly, all such modifications are intended to be included within the scope of the present disclosure. The order or sequence of any process or method operations may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method operations, the order of the operations may differ from what is depicted. Also two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations and decision operations.

What is claimed is:

1. An aircraft hazard warning system, comprising:
    at least one processor in communication with a radar antenna and a non-transitory storage medium storing processor executable code comprising instructions for:
    determining an F-factor associated with a predictive wind shear (PWS) condition;
    providing a D-220 specified PWS warning on an electronic display in response to a F-factor being above the DO-220 specified PWS threshold; and
    providing a pre-warning indicator on the electronic display in response to the radar system detecting wind shear activity which has not triggered the DO-220 specified PWS warning.

2. The aircraft hazard warning system of claim 1, wherein the pre-warning indicator indicates three or more levels, the three or more levels being determined in response to a magnitude of the F-factor below the DO-220 specified PWS threshold and within a first range, a second range, and a third range, respectively.

3. The aircraft warning system of claim 2, wherein the three or more levels are indicated by a bar, a color, and/or a textual reference, or any combination thereof.

4. The aircraft warning system of claim 1, wherein the pre-warning indicator is removed when the F-factor reaches the DO-220 specified PWS threshold and the D-220 specified PWS warning is displayed.

5. The aircraft warning system of claim 1, wherein the D-220 specified PWS warning is an RTCA DO-220 triangular warning.

6. The aircraft hazard warning system of claim 1, further comprising a user interface, wherein the user interface allows a pilot to select a view of an F-factor map on the electronic display or another electronic display.

7. The aircraft hazard warning system of claim 6, wherein the F-factor map provides an indication of F-factors at locations within a radar sweep.

8. The aircraft hazard warning system of claim 7, wherein the F-factors are indicted by color.

9. The aircraft hazard warning system of claim 8, wherein the user interface allows a pilot to view textual data on the electronic display or on another electronic display, the textual data comprising a maximum F-factor.

10. The aircraft hazard warning system of claim 1, wherein the pre-warning indicator comprises at least one bar, the bar having a length or color, or both, representing a magnitude of the F-factor.

11. A method of displaying an indication of potential wind shear activity on an electronic weather radar display for an aircraft, the method comprising:
    receiving radar returns;
    determining an existence of potential wind shear activity associated with at least one real world location using a radar system associated with the radar returns; and
    providing an indication of the potential wind shear activity on the electronic weather radar display at a first location on the electronic weather radar display corresponding to the real world location, the potential wind shear activity being different than a wind shear event associated with a predictive wind shear (PWS) icon, wherein the indication is a pre-warning indicator provided in response to the radar system detecting the potential wind shear activity which has not triggered a DO-220 specified PWS warning.

12. The method of claim 11, wherein the predictive wind shear icon is a color coded triangle.

13. The method of claim 11, wherein the indication of the potential wind shear activity comprises a chevron-shaped, or some other suitably shaped icon.

14. The method of claim 11, wherein the indication of the potential wind shear activity is color coded with respect to a level of the potential wind shear activity.

15. The method of claim 14, wherein the level is an F-factor magnitude.

16. The method of claim 11, wherein the indication of the potential wind shear activity comprises an arrow indicating a level of the potential wind shear activity.

17. The method of wherein 11, wherein the indication of the potential wind shear activity comprises a bar indicating a level of the potential wind shear activity.

18. An aircraft weather radar system, comprising:
an electronic display;
a radar antenna for receiving radar returns; and
an electronic processor configured to determine an existence of potential wind shear activity using the radar returns and cause the electronic display to provide an indication of the potential wind shear activity, the potential wind shear activity being different than a wind shear event associated with a predictive wind shear (PWS) icon wherein the indication is a pre-warning indicator provided in response to the aircraft radar system detecting the potential wind shear activity which has not triggered a DO-220 specified PWS warning.

19. The aircraft weather radar system of claim 18, wherein the electronic processor is configured to determine the existence by determining whether a non-zero F-factor value exists for a given region of radar swept space.

20. The aircraft weather radar system of claim 19, further comprising a user interface for selecting display of F-factor information.

* * * * *